United States Patent
Giefer et al.

(10) Patent No.: US 9,382,999 B2
(45) Date of Patent: Jul. 5, 2016

(54) SHIFT-BY-WIRE SHIFTING DEVICE HAVING MECHANICAL PARKING LOCK ACTUATION

(75) Inventors: Andreas Giefer, Lemfoerde (DE); Ludger Rake, Steinfeld (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 414 days.

(21) Appl. No.: 13/701,890

(22) PCT Filed: May 13, 2011

(86) PCT No.: PCT/EP2011/057734
§ 371 (c)(1),
(2), (4) Date: Apr. 16, 2013

(87) PCT Pub. No.: WO2011/151149
PCT Pub. Date: Dec. 8, 2011

(65) Prior Publication Data
US 2013/0199326 A1    Aug. 8, 2013

(30) Foreign Application Priority Data

Jun. 4, 2010  (DE) .......................... 10 2010 029 704

(51) Int. Cl.
*F16H 63/34* (2006.01)
*F16H 59/02* (2006.01)
*F16H 59/10* (2006.01)

(52) U.S. Cl.
CPC ................ *F16H 59/02* (2013.01); *F16H 59/10* (2013.01); *F16H 63/3491* (2013.01); *F16H 59/0204* (2013.01); *Y10T 74/20049* (2015.01)

(58) Field of Classification Search
CPC . F16H 59/10; F16H 59/0204; F16H 59/0278; F16H 59/02; F16H 59/08; F16H 61/36; F16H 61/22; F16H 61/24; F16H 63/38; F16H 63/3458; F16H 63/48; F16H 63/3491; F16H 63/36

USPC ................. 74/473.1, 473.14, 473.15, 473.21, 74/473.23, 473.24, 473.25, 473.26, 473.3, 74/473.35, 502, 502.5, 502.6; 180/330
See application file for complete search history.

(56) References Cited

U.S. PATENT DOCUMENTS 3,469,871 A * 9/1969 Betts .............................. 403/325
4,024,800 A * 5/1977 Masclet ............................ 92/26

(Continued)

FOREIGN PATENT DOCUMENTS

| DE | 101 25 526 A1 | 12/2002 |
| DE | 103 26 118 A1 | 1/2005 |
| DE | 10 2008 028614 B3 | 11/2009 |

OTHER PUBLICATIONS

International Search Report issued in international application No. PCT/EP2011/057734, mailed Nov. 11, 2011 (5 pages including translation).

(Continued)

*Primary Examiner* — William Kelleher
*Assistant Examiner* — Emily Cheng
(74) *Attorney, Agent, or Firm* — Brinks Gilson & Lione

(57) ABSTRACT

An actuation device for selecting gear settings of a shift-by-wire gear shifting transmission comprises an actuation element, a mechanical transference for actuating the parking brake, and a coupling device disposed between the actuation element and the mechanical transference. An actuation of the transference occurs selectively by the actuation element only when the parking brake setting is selected or de-selected at the shift lever.

It is possible, structurally as well as with respect to its installment, to simplify the transference mechanism necessary for the selective actuation of the transference means for the parking brake. Structural space and costs can be reduced, and the actuation device can be designed to be smooth and quiet.

12 Claims, 7 Drawing Sheets

(56) References Cited

U.S. PATENT DOCUMENTS

| | | | |
|---|---|---|---|
| 4,987,968 A * | 1/1991 | Martus et al. | 180/272 |
| 6,471,027 B1 * | 10/2002 | Gierer et al. | 192/219.5 |
| 6,748,820 B2 * | 6/2004 | Ruhlander | 74/502.4 |
| 6,823,976 B2 * | 11/2004 | Schmid | 192/219.5 |
| 6,851,538 B2 * | 2/2005 | Meyer et al. | 192/219.4 |
| 6,945,377 B2 * | 9/2005 | Burr et al. | 192/220.2 |
| 7,322,457 B2 * | 1/2008 | Giefer et al. | 192/219.4 |
| 7,650,978 B2 * | 1/2010 | Ruhringer et al. | 192/219.6 |
| 7,661,334 B2 * | 2/2010 | Giefer et al. | 74/523 |
| 7,762,739 B2 * | 7/2010 | Blanchard | 403/322.2 |
| 7,866,763 B2 * | 1/2011 | Inagaki | 303/89 |
| 8,053,691 B2 * | 11/2011 | Vernacchia et al. | 200/61.91 |
| 8,763,764 B2 * | 7/2014 | Jang et al. | 188/31 |
| 2005/0098400 A1 * | 5/2005 | Kleinert et al. | 188/300 |
| 2008/0236967 A1 * | 10/2008 | Mayr | 188/300 |
| 2010/0175492 A1 * | 7/2010 | Spaeth et al. | 74/473.11 |

OTHER PUBLICATIONS

Written Opinion issued in international application No. PCT/EP2011/057734, dated Dec. 4, 2012 (7 pages including translation).

* cited by examiner

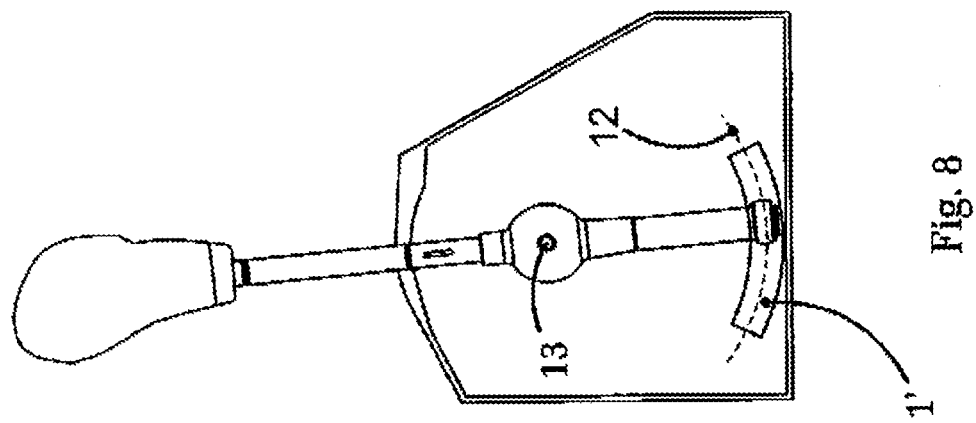
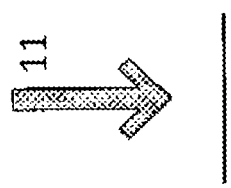
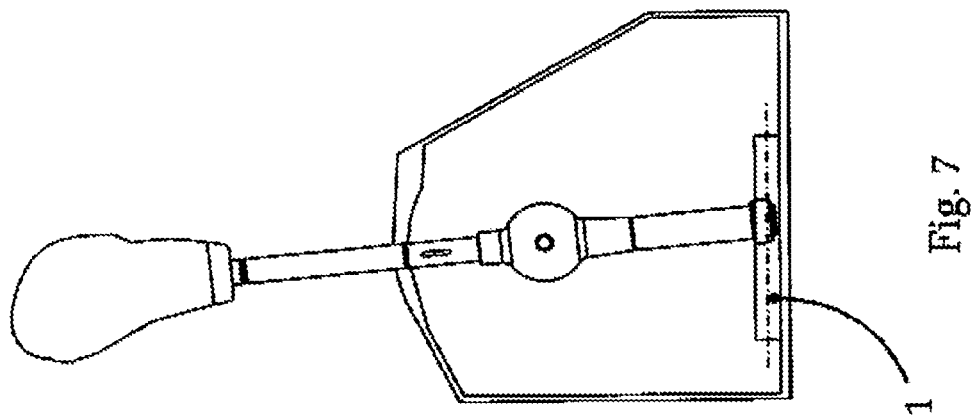
Fig. 7
Fig. 8

SHIFT-BY-WIRE SHIFTING DEVICE HAVING MECHANICAL PARKING LOCK ACTUATION

This application is a filing under 35 U.S.C. §371 of International Patent Application PCT/EP2012/057734, filed May 13, 2011, which claims priority to German Application No. 10 201 0 029 704.6, filed Jun. 4, 2010, each of which is incorporated by reference herein in its entirety.

The invention relates to an actuating device for the selection of gear settings of a shift-by-wire controlled vehicle transmission having a selectively actuated mechanical transference means for the parking brake actuator according to the preamble to Claim 1.

Parking brakes are implemented if non-mechanical components are used in the driving force transmission in the vehicle—for example, with automatic transmissions having hydrodynamic torque converters. In these transmissions, even when a gear is engaged, there is not always a continuous mechanical force, or form locking, respectively, between the vehicle motor and the wheels of the motor vehicle.

Motor vehicles with an automatic transmission normally contain, accordingly, a parking brake, in order to prevent an unintentional rolling away of the vehicle when it is stopped and the motor is turned off.

In order to improve the structural design possibilities with regard to the free configuration of the actuation device in the passenger compartment, and to ensure a better acoustic disengagement of the actuating device from the drive train of the motor vehicle, the shift-by-wire principle is increasingly incorporated in modern motor vehicles, or automatic transmissions, respectively, particularly with modern automatic transmissions or vehicle transmissions that are increasingly fully electronically controlled as well.

With "shift-by-wire" transmissions of this type, the transmission of the gear shifting command from the actuation device, or from the shift lever of the automatic transmission, therefore normally occurs exclusively by means of electric or electronic signals. Regarding the parking brake, this means, in other words, that, if applicable, the actuation of the parking brake also occurs electrically or electronically. In certain cases, an actuation of the parking brake can even be automatically provided, for example in the case of "auto-P," in other words, in the case where the automatic engagement of the parking brake occurs when the ignition key is removed, or when exiting the vehicle.

Independently of whether the transmission actuation is based on a non-mechanical, shift-by-wire principle, or concerns a substantially conventional, mechanical transmission actuation, there is frequently the fundamental need to be able to actuate the parking brake no matter what, even when the electronic system is not functioning—or in general, when the electric power supply of the motor vehicle is not functioning—in a purely mechanical manner, in particular, to be able to disengage said parking brake, in order to still be able to move the motor vehicle, even when this is the case. This is relevant, for example, when the vehicle is taken to a garage for repairs, or when being towed because of a breakdown.

For this, actuation devices for shift-by-wire controlled transmissions are known, in which a supplementary mechanical connection, a rod or a cable pull, for example, is present between the shift lever and the transmission. In this manner, the parking brake, no matter what, even with a complete loss of the electrical system for the transmission actuation, can be actuated mechanically, via the cable pull, such that the vehicle still moves, even in this case, or remains securely parked, as the case may be.

In order, thereby, to minimize the actuation path of the cable pull between the actuation device and the transmission, in order to prevent unnecessary wear to the mechanical parking brake actuator, and in order to keep the drag caused by the mechanical parking brake actuator a low as possible when actuating the shift lever, actuation devices have been developed in which the cable pull for mechanical actuation of the parking brake is only selectively moved if the shift lever is actually to be shifted to the engaged parking brake position, or to the released parking brake position. Otherwise, the mechanical parking brake actuator is disengaged from the shift lever during other movements of the shift lever between the individual gear settings, or shifting paths—by means of an appropriate design of the transmission mechanism in the actuation device. In this manner, the other shift lever movements can occur smoothly and without repercussions to the shift lever from the frictional forces originating from the mechanical parking brake actuator.

A generic actuation device of this type is known, for example, from the document DE 103 26 118 B4. This known actuation device comprises a shift lever that can be moved along a shifting path, and a cable pull as a mechanical transference means for the actuation of the parking brake.

This known actuation device also comprises a transmission mechanism having a multiple joint connection in the form of transmission components coupled to one another, wherein the multiple joint connection—only in the case where the shift lever is moved to the engaged parking brake setting or to the released parking brake setting—actuates the cable pull for the parking brake.

This actuation device, known from the prior art, is, however, comparatively elaborate, both structurally, and in terms of its installation, in particular because the multiple joint connection in this actuation device contains numerous transmission components, which in turn must be taken into account with a control plate disposed on the shift lever.

Furthermore, rattling sounds may occur with this actuation device, known from the prior art, if the comparably numerous components of the multiple joint connection used therein do not engage with one another and with the control plate on the shift lever in a manner entirely free of play. In addition, the respective component tolerances, or the respective play between the diverse transmission components adjacent to one another, add together, for which reason, the components for this known actuation device must be produced and assembled particularly precisely. Finally, the actuation device known from this prior art is furthermore only suitable to a limited degree for transference means that are actuated by pulling, such as with simple functioning cable pulls and similar items.

With this background, it is the objective of the present invention to create an actuation device, with which the transmission mechanism, for the selective actuation of the transference means for the parking brake (i.e. only with the releasing or engaging of said parking brake by moving the shift lever to the "P" position), can be simplified both structurally as well as with regard to the installation, wherein a smooth, reliable and quiet actuation is to be ensured. Moreover, the cost-savings potential, in comparison with the structurally more elaborate solutions known from the prior art, should be increased.

This objective is attained by means of an actuation device according to Claim 1. Preferred embodiments are the subject matter of the dependent Claims.

In a known manner, per se, the actuation device according to the present invention serves for the selection of gear settings and the generation of the associated shifting with a shift-by-wire controlled transmission, such as an automatic transmission for a motor vehicle, for example. For this purpose, the actuation device exhibits, in a likewise known manner, an actuation element that can be moved along at least one shifting path between at least one, preferably more, driving gear settings and a parking brake setting, such as, for example, a shift lever. Furthermore, the actuation device comprises a coupling device between the actuation element and the transference means. An actuation of the transference means then occurs by means of the coupling device, only in the case of a release or engagement of the parking brake by means of the actuation element, while with other movements of the actuation element, a shift lever, for example, no actuation of the transference means occurs.

According to the invention, the actuation device is distinguished in that the coupling device comprises a substantially prismatic bearing guide having a notching and a coupling carriage supported in a displaceable manner in the bearing guide, wherein the coupling carriage is in two parts, and exhibits an actuation-side and a transference means-side carriage part. When engaged, the actuation-side carriage part and the transference means-side carriage part overlap one another—along the axis of the bearding guide—within a shared overlap section of both carriage parts when in the coupled position.

Furthermore, a locking element, disposed in a moveable manner at a right angle to the axis of the bearing guide, is supported in the transference means-side carriage part (in the region of the overlap section adjacent to the bearing guide), for the selective mutual locking of the two carriage elements. The locking element moves across the bearing guide and the notch disposed therein when the coupling carriage moves, or respectively, when the transference means-side carriage part moves. Depending on the position of the coupling carriage in the bearing guide, the locking element thus slides along the surface of the bearing guide, or drops into the notch—when its relative position in the coupling carriage has been changed.

Through this motion along the bearing guide and the notch disposed therein, the locking element can be moved through a corresponding movement of the coupling carriage or, respectively, the transference means-side carriage part from a first relative position in the coupling carriage to a second relative position.

In doing so, in the first relative position of the locking element, the two carriage parts are rigidly coupled to one another by means of engagement of the locking element supported in the transference means-side carriage part to the actuation-side carriage part as well, while the engagement of the locking element in the actuation-side carriage part—and therefore coupling the two carriage parts—in the second relative position of the locking element (in relation to the coupling carriage, or to the transference means-side carriage part) is released.

The second relative position of the locking element, in which the locking element is engaged in the notch, is designed in a non-self-limiting manner by means of the appropriate shaping of the locking element and/or the notch, such that the locking element can be forced out of the notch through the appropriate counter-movement of the coupling carriage.

This means, in other words, that the position of the locking element, and therefore the coupling state of the two carriage parts, is guided or controlled by the movement of the coupling carriage—or, respectively, the transference means-side carriage part having the locking element supported therein—such that (by means of moving along the bearing guide, and the notch disposed therein, through the locking element sliding along said bearing guide)—depending on the axial position of the coupling carriage in the bearing guide—either the two carriage parts become engaged or disengaged from one another.

This design, according to the invention, of the coupling device can then, for the selective actuation of the transference means between the actuation device and the vehicle transmission, or, respectively, the parking brake handle, be applied in such a way that an actuation and therefore a movement of the transference means (for example, a cable pull) then only occurs if the actuation element, for example, the automatic shift lever, is moved out of the parking brake setting, or into the parking brake setting, while the transference means, or the cable pull, respectively, is disengaged from the other movements of the actuation element, or the shift lever, respectively. The movements of the shift lever beyond the region of the parking brake setting, in particular between the other shift lever settings, such as R, N, D etc., for example, are therefore registered solely through the electronic sensor system of the actuation device, and transmitted to the transmission, while the cable pull and the mechanism of the parking brake actuator remain motionless in the transmission.

According to a particularly preferred embodiment of the invention, the locking element fixes, thereby, in its second relative position—by means of its existing engagement in this case, in the notch in the bearing guide—the transference means-side carriage part in relation to the bearing guide along the axial plane. This means in other words, that the transference means-side carriage part—together with the transference means itself—is fixed, in the separated state of the two carriage parts, in relation to the bearing guide, by means of the locking element. As a result, the parking brake, disengaged by means of the transference means thus also remains securely deactivated until the two carriage parts are again guided together and coupled to one another by means of a corresponding movement of the actuation element, or shift lever, whereupon, in turn, the activation of the parking brake can occur by means of the mechanical force transmission chain "shift lever, coupled carriage parts and transference means."

Preferably the locking element is blocked in its second relative position thereby by means of a surface of the actuation-side carriage part, as long as the two carriage parts are not in a coupled position, but rather, in relation to their coupled position, are in a separated relative position.

This means, in other words, that the locking element in its second relative position, in which it engages in the notch in the bearing guide and thus fixes, in a form-locking manner, the transference means-side carriage part in relation to the bearing guide by means of a surface of the actuation-side carriage part in this second relative position, for as long as the two carriage parts are not in the coupled position.

According to a possible embodiment of the invention, the locking element therein, in its simplest form, is designed as a substantially cylindrical pin. Accordingly, the locking element can be disposed and guided in a movable manner into a likewise simple cylindrical hole in the transference means-side carriage part, which, overall, provides for a cost-efficient production of the actuation device according to the invention.

According to one preferred embodiment of the invention, the locking element is spring-loaded in the direction of the surface of the bearing guide. In this manner, the reliable placement of the locking element on the surface of the bearing guide, and the moving of the locking element into the notch of the bearing guide—upon reaching the corresponding relative position of the coupling carriage in the bearing guide—can be ensured.

The non-self-limiting design of the second relative position necessary for returning the locking element from its second relative position to its first relative position, can be designed in accordance with other embodiments of the invention, in particular in the form in which either the locking element, at the end in which it engages in the notch, or the notch itself (or even both the locking element and the notch) exhibits a beveling on the surface facing the transference means. In this manner, the locking element, located in its second relative position in the notch, is forced out of the notch by means of a movement of the transference means-side carriage part—with the locking element supported therein—toward the transference means (due to the beveling or bevelings) and is thus returned to its first relative position. A non-self-limiting design of the second relative position of the locking element is a prerequisite for the effectiveness of the coupling device according to the invention, not only regarding the decoupling, but also regarding the re-coupling of the two carriage parts of the coupling carriage.

According to another embodiment of the invention, the locking element and/or the coupling recess of the actuation-side carriage part also contains a beveling in the region of the end of the locking element engaging in the coupling recess of the actuation-side carriage part. This beveling serves to support the movement of the locking element from its first relative position to its second relative position. In this manner, the connection of the locking element from its first relative position, in which the two carriage parts are coupled to one another, to its second relative position, in which the carriage parts are disengaged from one another, is facilitated, or actively supported, respectively. If applicable, an otherwise necessary spring element for moving the locking element from its first to its second relative position can be eliminated, thanks to this embodiment.

The invention can be realized, as a matter of principle, independently of the type and structural design of the transference means, and can thus also be implemented, in particular, with rigid transference means such as rods, as well as with double-acting cable pulls such as, for example, push/pull cable pulls.

According to another embodiment of the invention, the transference means is, nonetheless, a simple functioning cable pull. This can be installed on or beneath the floor of the vehicle in a flexible manner, and enables a minimization of the undesired transference of mechanical sounds between the transmission and the actuation device, or shift lever, respectively. By means of a simple functioning cable pull, the parking brake can be deactivated, in particular, with a pure pulling movement of the cable pull, by means of which the maintaining of the function of the cable pull requires only a minimal pre-loading of the cable pull, as a result of which, in turn, advantageously, only correspondingly minimal frictional losses occur.

According to another particularly preferred embodiment of the invention, it is provided that the coupling device of the actuation device is designed substantially symmetrical to a longitudinal plane of the bearing guide. For this, the coupling device comprises two locking elements, disposed with respect to the longitudinal plane such that they run in opposition to one another—in the transference means-side carriage part.

Preferably, the transference means-side carriage part forms thereby a substantially prismatic or fork shaped carriage recess in the section overlapping the actuation-side carriage part. At the same time, the actuation-side carriage part exhibits a projection or peg in the overlapping section corresponding to the shape of the recess in the carriage of the transference means-side carriage part, wherein the locking element is disposed in the region of the prismatic or, respectively, fork shaped carriage recess of the transference means-side carriage part.

In other words, this means that the two carriage parts in this embodiment are designed in accordance with a plug-socket type connection, and likewise engage in one another. For this, preferably two locking elements are symmetrically disposed in the region of the edge of the transference means-side carriage part adjacent to the bearing guide (which represents the socket of the plug-socket analogy). The actuation-side carriage part (which represents the plug in this case), according to the analogy thus penetrates the transference means-side carriage part in order to couple with the transference means-side carriage part.

Another possible embodiment of the invention provides that the coupling device is designed on the whole in the shape of an arc, and is disposed along an arc section, substantially about a point of rotation of the shift lever. In other words, this means that both the bearing guide as well as the coupling carriage, having the two carriage parts, are designed in the form of an arc, as a result of which, the coupling carriage, or the two carriage parts, respectively, can thus no longer move in a linear manner, but instead move along an arc shaped pathway in the—in this case likewise arc shaped—bearing guide, wherein the focal point of the arc shaped pathway coincides substantially with the point of rotation of a shift lever of the actuation device.

Thanks to this embodiment, the differences in the movement pathways of, in particular, the actuation-side carriage part and the end of the shift lever engaging in the actuation-side carriage part can be minimized, or even eliminated. This is because with this embodiment, when actuated, both the shift lever end as well as the coupling carriage each execute arc shaped movements having—depending on the structural design—a nearly or precisely identical radius and focal point. Play and relative movements between the end of the shift lever and the coupling carriage can be minimized in this manner, and the on the whole, the actuation device can be designed to be even smaller.

In the following, the invention shall be explained in greater detail based on drawings depicting only one embodiment example. They show:

FIG. 1 from a top view, the coupling device according to one embodiment of the actuation device according to the invention;

FIG. 2 in a schematic view, the coupling device according to FIG. 1, having coupled carriage parts;

FIG. 3 in a schematic view, the coupling device according to FIG. 2 at the starting point of the decoupling of the two carriage parts;

FIG. 4 in a schematic view, the coupling device according to FIGS. 2 and 3 during the decoupling of the two carriage parts;

FIG. 5 in a schematic view, the coupling device according to FIGS. 2-4, with entirely decoupled carriage parts;

FIG. 6 in a schematic view, the coupling device according to FIGS. 2-5 in the further movement of the actuation-side carriage part;

FIG. 7 is a schematic view of the coupling device according to FIGS. 1-6, with a linearly designed bearing guide; and FIG. 8 is a schematic view of a coupling device according to a second embodiment of the actuation device with an arc-shaped designed bearing guide.

Figure 1:
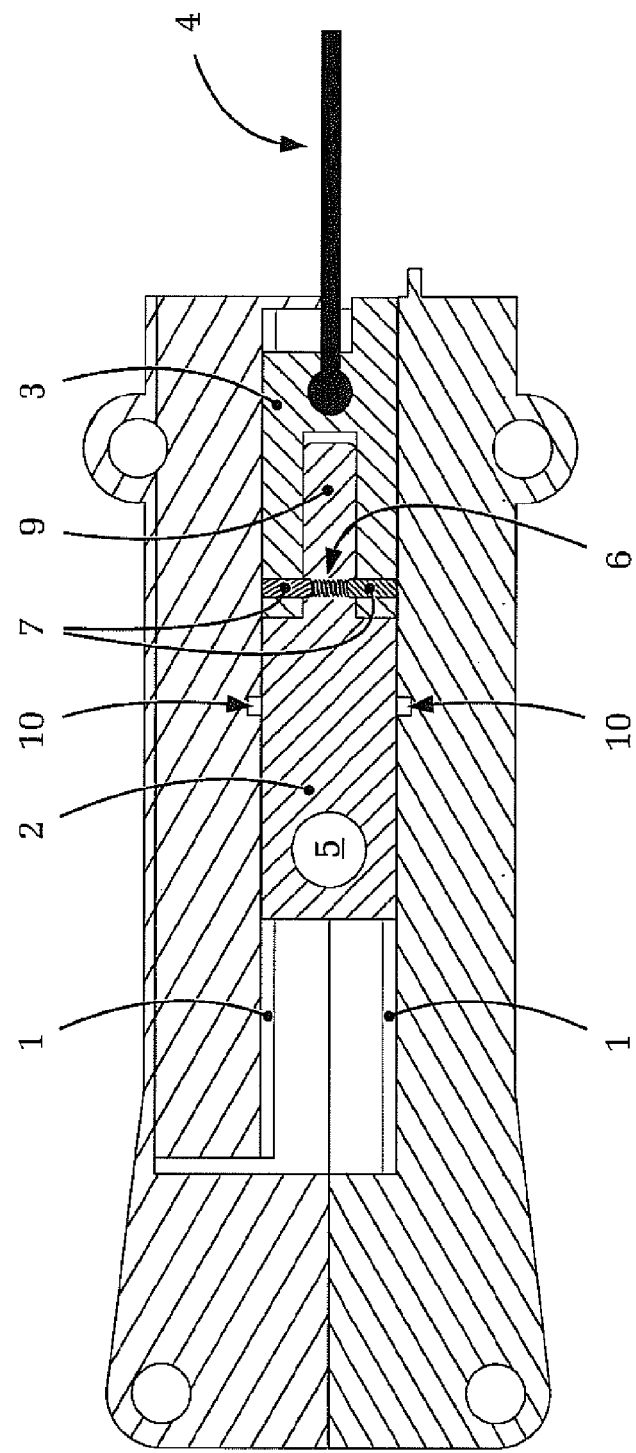
FIG. 1 shows the coupling device of one embodiment of an actuation device according to the invention in a top view. One first sees a prismatic bearing guide 1, which is connected in a permanent manner to a (not shown) base or shift lever housing.

A coupling carriage 2, 3 is disposed in the bearing guide 1, connected on the right-hand end, with respect to the drawing, to a cable pull 4 leading to the transmission, wherein the cable pull 4 serves for actuating the parking brake in the transmission. At the left end, with respect to the drawing, of the coupling carriage 2, 3, there is a receptor 5 for the engagement of a (not shown) actuation element or shift lever of the actuation device in the left-hand, with respect to the drawing, actuation-side carriage part 2.

The coupling carriage 2, 3 consists, according to the invention, of an actuation-side carriage part 2, and a transference means-side carriage part 3. The actuation-side carriage part 2, and transference means-side carriage part 3 are still coupled securely to one another in the state of the coupling device according to FIG. 1. For the purpose of the coupling of the two carriage parts, two spring loaded locking elements 7 running in opposition to one another are disposed in the transference means-side carriage part 3, positioned in the depicted embodiment by means of a (only schematically indicated) spring 6. The state of the coupling device according to FIG. 1, as well as the relative position of the coupling carriage 2, 3 within the bearing guide 1, according to FIG. 1, correspond thereby to the parking brake setting selected on the actuation element or shift lever, respectively, of the actuation device.

The locking elements 7 move along the respective inner surfaces of the bearing guide 1 with their outward facing ends, while the internal ends of the locking elements 7, facing toward each other in the depicted coupled state of the coupling carriage 2, 3, still engage in corresponding coupling recesses 8 (cf. FIG. 6) in the region of the coupling peg 9 of the actuation-side carriage part 3. This means that the two carriage parts 2, 3, securely coupled to one another by means of the locking elements 7, are securely coupled to one another as long as the locking elements 7 are prevented by the inner surface of the bearing guide 1 from sliding outward in a spring loaded manner.

FIGS. 2-6 show the coupling of the two carriage parts 2, 3 by means of the locking elements 7, as well as the sequence of the separation of the two carriage parts 2, 3 through a movement of the actuation element or shift lever—starting from the parking brake setting—in a more detailed, but only schematic depiction. For purposes of clarity, the spring element 6 (cf. FIG. 1), which pushes the locking elements 7 outward toward the inner surface 1 of the bearing guide, is omitted from the depictions in FIGS. 2-6.

Figure 2:
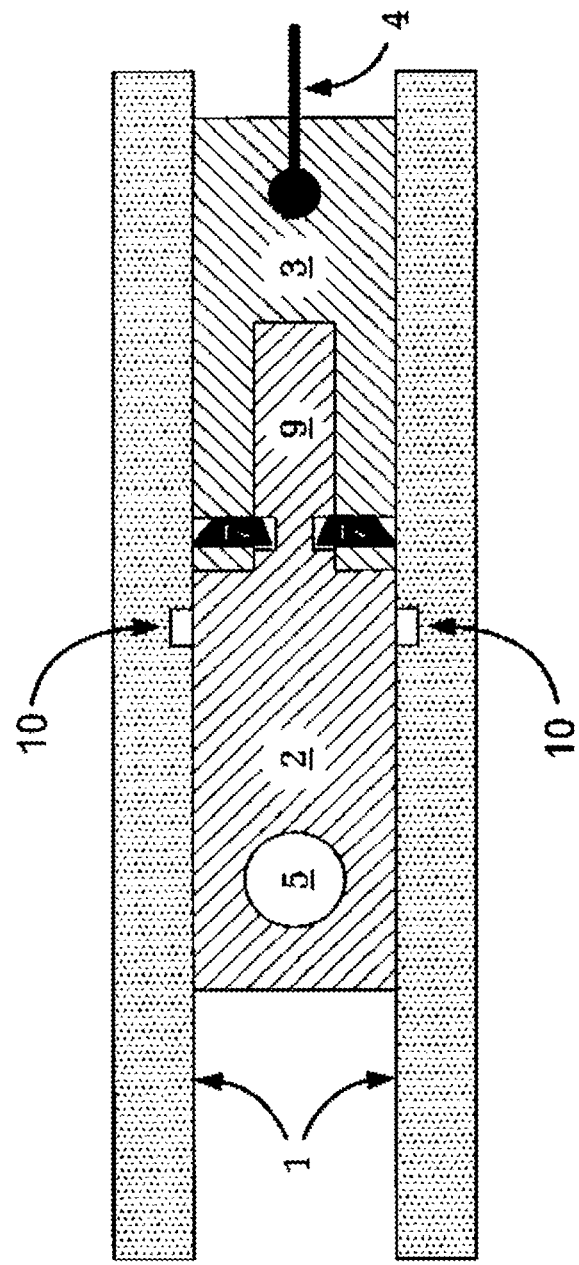

One sees in FIG. 2 that the two carriage parts 2, 3 are first securely coupled to one another by means of the two locking elements 7, because the locking elements 7 are guided along the inner surface 1 of the bearing guide, such that they make contact with said bearing guide, and thus are unable to vacate their position coupling the two carriage parts 2, 3 in the coupling carriage according to FIG. 2.

If the actuation element, the shift lever, for example, of the actuation device, is moved out of the parking brake setting (cf. carriage position in FIG. 2), this then first results in a displacement of the coupling carriage 2, 3 to the left, with respect to the drawing. In doing so, the two carriage parts 2, 3 are at first still coupled to one another by means of the locking elements 7 according to FIG. 2, such that, accordingly, a pulling actuation of the cable pull 4 occurs, by means of which, in turn, the parking brake is deactivated in the transmission.

Shortly before reaching the shift lever setting "R" by the actuation element, or the shift lever (starting from the parking brake setting according to FIG. 2), the coupling carriage 2, 3 subsequently arrives at the relative position in the bearing guide 1 depicted in FIG. 3. At this point, the spring loaded locking elements 7 pushed outward by the (not shown) spring element 6 (according to FIG. 1) begin to enter the respective notches 10 in the respective bearing guide 1, see FIG. 3.

Figure 4:
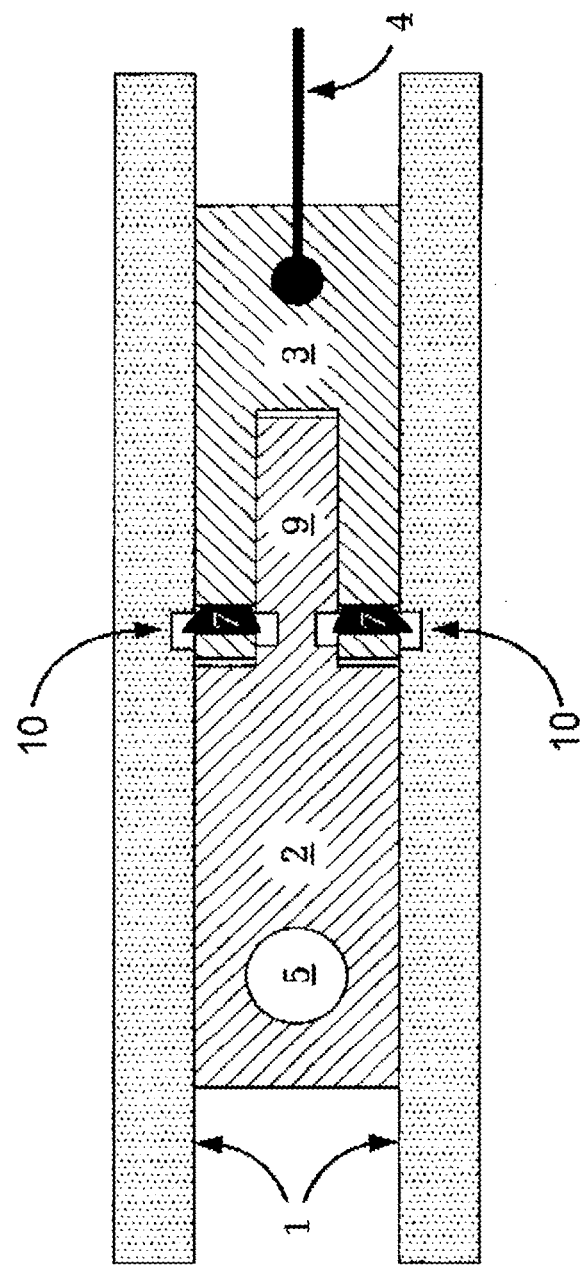

With the further movement of the coupling carriage 2, 3 toward the left, with respect to the drawing, the situation according to FIG. 4 then occurs. At this point, the two carriage parts 2, 3 begin to separate from one another, wherein the further movement of the locking elements 7 in the notches 10 of the bearing guide 1 is supported by the bevelings of the end surfaces of the locking elements 7, indicated here in an exemplary fashion.

Figure 3:
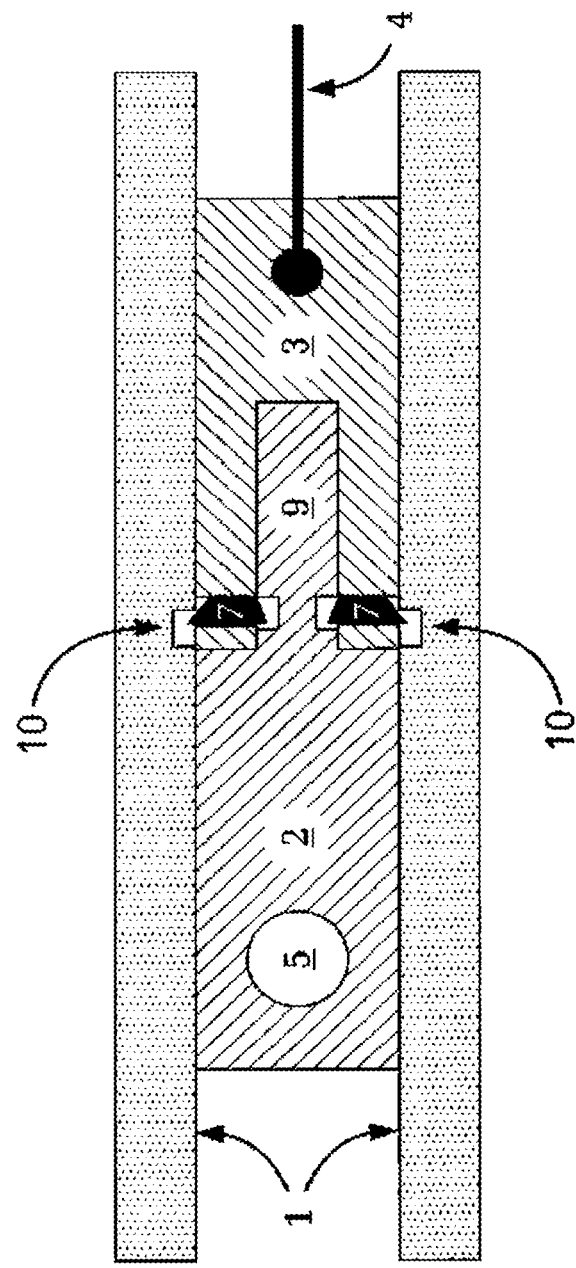
Figure 5:
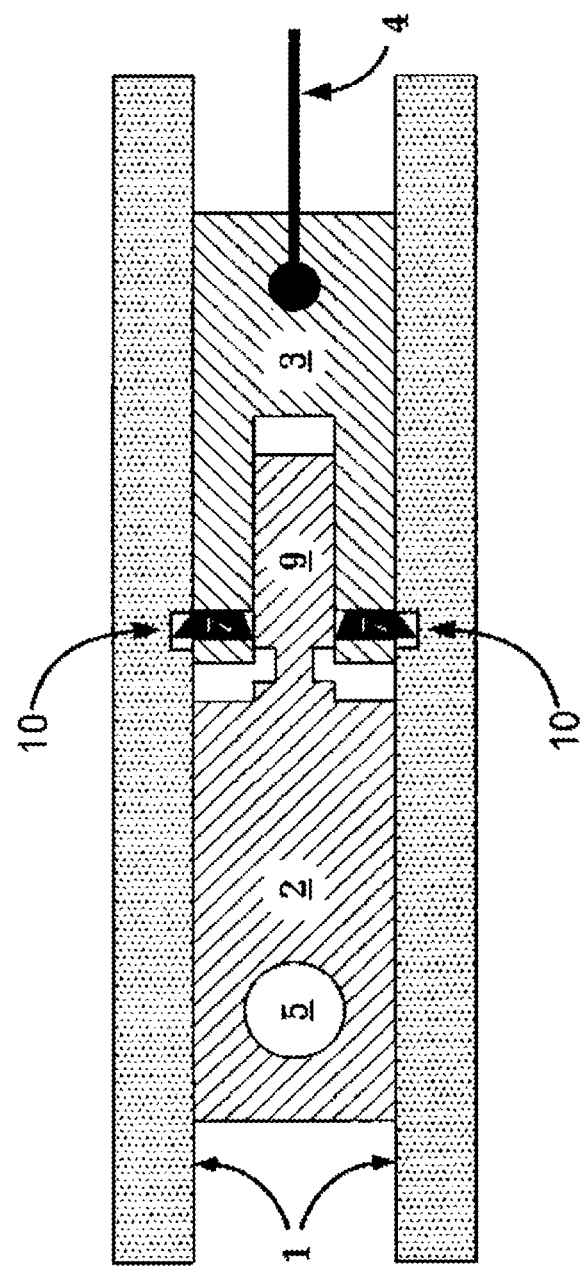
Figure 6:
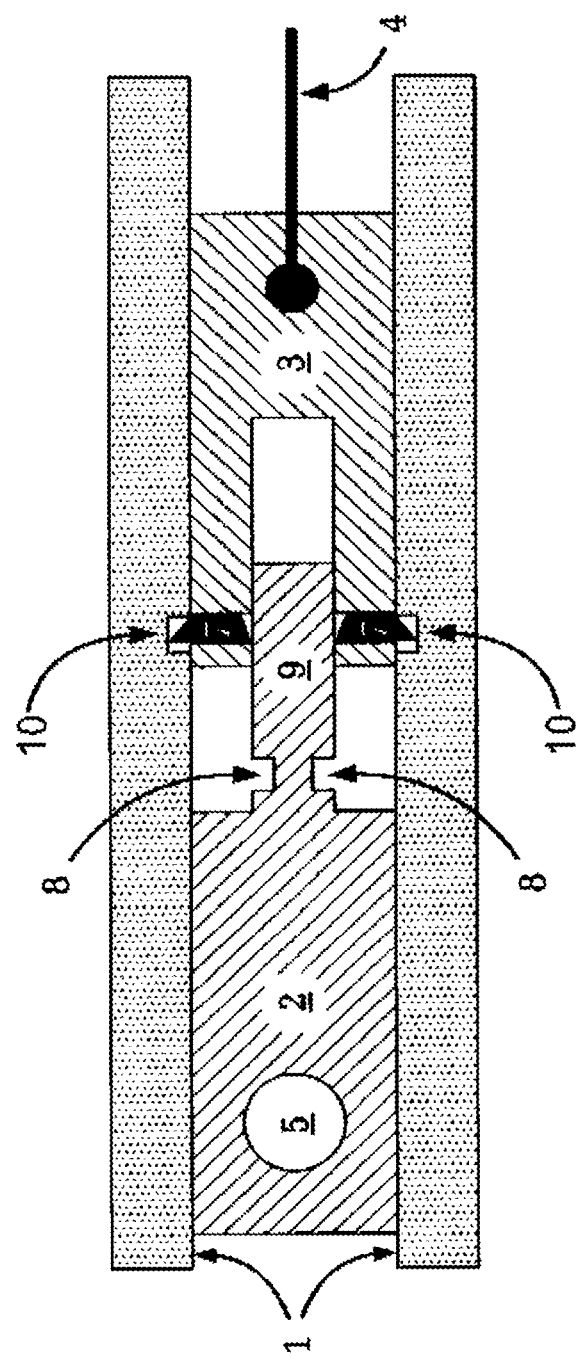

Alternatively, or in addition to the bevelings of the end surfaces of the locking elements 7 depicted in FIGS. 2-6, the lateral walls of the notches 10 in the bearing guide 1 and/or the coupling recesses 8 (cf. FIG. 6) in the coupling peg 9 of the left-hand, with respect to the drawing, actuation-side carriage part 2, facing toward the cable pull 4, can also be correspondingly beveled, in order, in this manner, to support the movement of the locking elements 7 between their two relative positions according to FIG. 3, or respectively, according to FIGS. 5 and 6, in one or both directions.

In the situation according to FIG. 5, the locking elements 7 are in their end positions according to the second relative position of the locking elements 7, and the two carriage parts 2, 3 are entirely decoupled from one another. The further movement of the actuation element, or the shift lever, and the left-hand, with respect to the drawing, carriage part 2 coupled thereto can, according to FIG. 6, thus occur, without another (undesired) further actuation thereby of the right-hand, with respect to the drawing, carriage part 3 and the cable pull 4 connected thereto, occurring in the transmission.

At the same time, both the right-hand carriage part 3, on the side with the cable pull, as well as the cable pull 4 itself, are fixed in the relative position obtained according to FIG. 5 in the bearing guide 1 by means of the locking elements 7. This is contingent on the locking elements 7 being, in accordance with FIG. 6, in their second relative position—in which they are inserted in the notches 10 of the bearing guide 1—axially blocked by the surface of the coupling peg 9 on the left-hand, with respect to the drawing, carriage part 2, until the two carriage parts 2, 3 are again guided together by means of a corresponding movement of the actuation element, or shift lever.

With a movement of this type of the actuation element, or shift lever, from one of the gear setting positions "N," "D," etc. (cf. situation in FIG. 6) back to the gear setting position "R" (cf. situation in FIG. 3 or 4), the sequence depicted in FIGS. 2-5 of the decoupling of the two carriage parts 2, 3 takes place in an analogous manner, but only in the reverse order. The return of the locking elements 7, from their second relative position in the notches 10 of the bearing guide 1 (cf. FIG. 5 or 6), to their first relative position according to FIG. 2 occurs thereby via the beveling of the end surfaces of the locking elements 7 at the ends toward the bearing guide, by means of which the spring force of the (not shown here) spring element 6 (cf. FIG. 1) is overcome, and the spring element 6 is again loaded.

Two different possibilities, fundamentally comprised by the invention, for the configuration or design of the coupling device according to the invention, are depicted in FIGS. 7 and 8—only extremely schematically and subject to a simplifying disregard of the circuitry. The arrow 11 typifies in this case the perspective to the plane of the page in the depictions according to FIGS. 1-6.

The variation of the coupling device according to FIG. 7 comprises a linearly designed bearing guide 1 for receiving the coupling carriage or the carriage parts 2, 3 (cf. FIGS. 1-6), while the bearing guide 1' according to FIG. 8 is designed in the shape of an arc, and runs along an arc segment 12, the focal point of which coincides substantially With the point of rotation for the shift lever 13. In the variation according to FIG. 8, the entire coupling device in particular the bearing guide 1' and the coupling carriages 2, 3 are thus accordingly bowed in the shape of an arc segment. As a result, the relative movements and play in the region of the shift lever engagement with the coupling carriage can be reduced or eliminated, and in addition, possibilities arise for a particularly compact structural design of the actuation device.

As a result, it is thus clear that an actuation device is created with the invention, in which the transference mechanism for actuating the transference means, or cable pull, respectively—selectively, only though shifting to or from the shift lever setting "P"—can be designed to be structurally simple, in particular, cost-effective, and at the same time, space saving and robust. Overall, thanks to the invention, a reliable, smooth, and quiet design of the mechanical parking brake actuator is obtained.

LIST OF REFERENCE SYMBOLS 1 bearing guide, guide surface
2, 3 coupling carriage, carriage parts
4 cable pull
5 actuation receptor
6 spring element
7 locking element
8 coupling recess
9 coupling peg
10 notch
11 point of view
12 arc segment
13 point of rotation of the shift lever

The invention claimed is:

1. An actuation device for selecting gear settings of a shift-by-wire gear shifting transmission, the actuation device comprising:
   an actuation element that can move along a shifting path between a parking brake setting and a driving gear setting,
   a mechanical transference device for mechanically actuating the parking brake, and
   a coupling device disposed between the actuation element and the mechanical transference device,
   wherein the coupling device is configured for the selective actuation of the mechanical transference device only when the actuation element moves into or out of the parking brake setting,
   wherein the coupling device comprises a substantially prismatic bearing guide having a notch and a two-part coupling carriage supported in a displaceable manner along the bearing guide, the two-part coupling carriage comprising an actuation-side carriage part and a transference-device-side carriage part,
   wherein the actuation-side carriage part and the transference-device-side carriage part overlap one another in the coupled position at an overlap section in an axial plane of the bearing guide,
   wherein a locking element is disposed in the transference-device-side carriage part in the overlapping section, at a right angle to the bearing guide, supported in a moveable manner, and spaced apart from the bearing guide and the notch,
   wherein the locking element can move perpendicular to the bearing guide between a first relative position and a non-self-limiting second relative position, wherein when the locking element is in the first relative position, the actuation-side carriage part and the transference-device-side carriage part are coupled together by an engagement of the locking element in both parts of the two-part coupling carriage and when the locking element is in the non-self-limiting second relative position, by moving the two-part coupling carriage along the bearing guide so that the locking element is over the notch, the engagement of the locking element with the actuation-side carriage part is released.

2. The actuation device according to claim 1, wherein the locking element is axially fixed in its second relative position by engagement in the notch of the bearing guide by the transference-device-side carriage part in the bearing guide.

3. The actuation device according to claim 1, wherein the locking element is blocked in its second relative position when the actuation-side carriage part and the transference-device-side carriage part are in a non-coupled relative position, separated from one another with respect to their coupling position.

4. The actuation device according to claim 1, wherein the locking element is a substantially cylindrical pin.

5. The actuation device according to claim 1, wherein the locking element is spring-loaded in the direction of the surface of the bearing guide.

6. The actuation device according to claim 1 wherein, the locking element exhibits a beveling in the region of its end engaging in the notch on the side toward the mechanical transference device, for the purpose of returning the locking element to its first relative position with a movement of the transference-device-side carriage part, with the locking element supported therein, toward the mechanical transference-device.

7. The actuation device according to claim 1, wherein the notch exhibits a beveling on the side toward the mechanical transference device for the return of the locking element to its first relative position with a movement of the transference-device-side carriage part, with the locking element supported therein, toward the mechanical transference device.

8. The actuation device according to claim 1, wherein the locking element and a coupling recess of the actuation-side carriage part exhibit a beveling in the region of the locking element at the side toward the mechanical transference device at the end of the locking element engaging in the coupling recess, for supporting the movement of the locking element from its first to its second relative position.

9. The actuation device according to claim 1, wherein the mechanical transference device is a cable pull.

10. The actuation device according to claim 1, wherein the coupling device is substantially symmetrical to a longitudinal plane of the bearing guide, and
   comprises two locking elements disposed in opposition to one another.

11. The actuation device according to claim 1, wherein the transference-device-side carriage part exhibits a substantially prismatic or fork-shaped carriage recess in the section overlapping the actuation-side carriage part, and the actuation-side carriage part exhibits a projection corresponding in shape to the carriage recess in the overlapping section, wherein the locking elements are disposed in the region of the carriage recess of the transference-device-side carriage part.

12. The actuation device according to claim 1, wherein the coupling device is arc shaped and is disposed along an arc segment about a point of rotation of the shift lever.

\* \* \* \* \*